E. C. BOWERS.
TANK FILLER.
APPLICATION FILED NOV. 13, 1917.
1,324,995.
Patented Dec. 16, 1919.
2 SHEETS—SHEET 1.
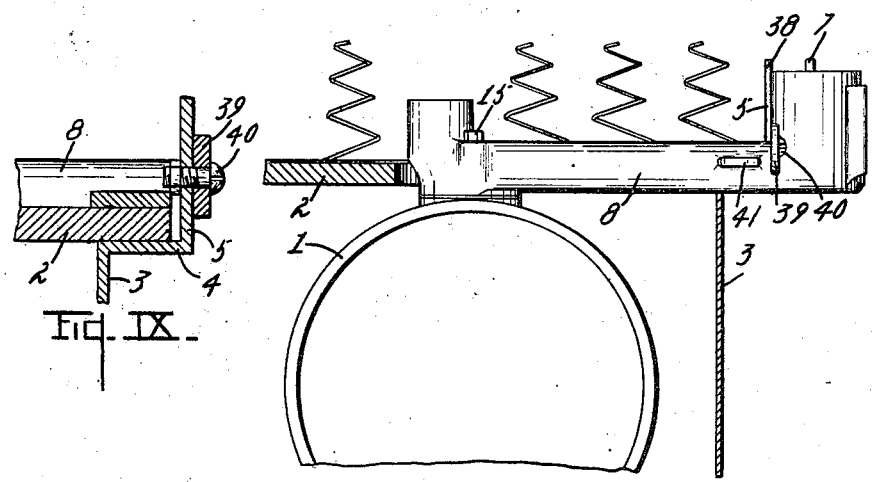
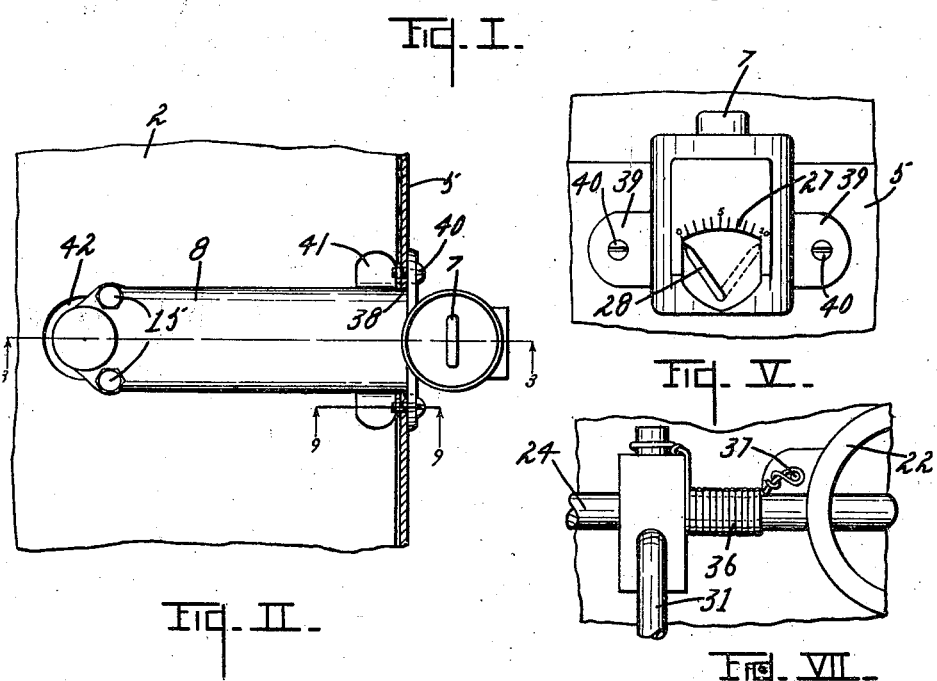
Inventor
ERNEST C. BOWERS

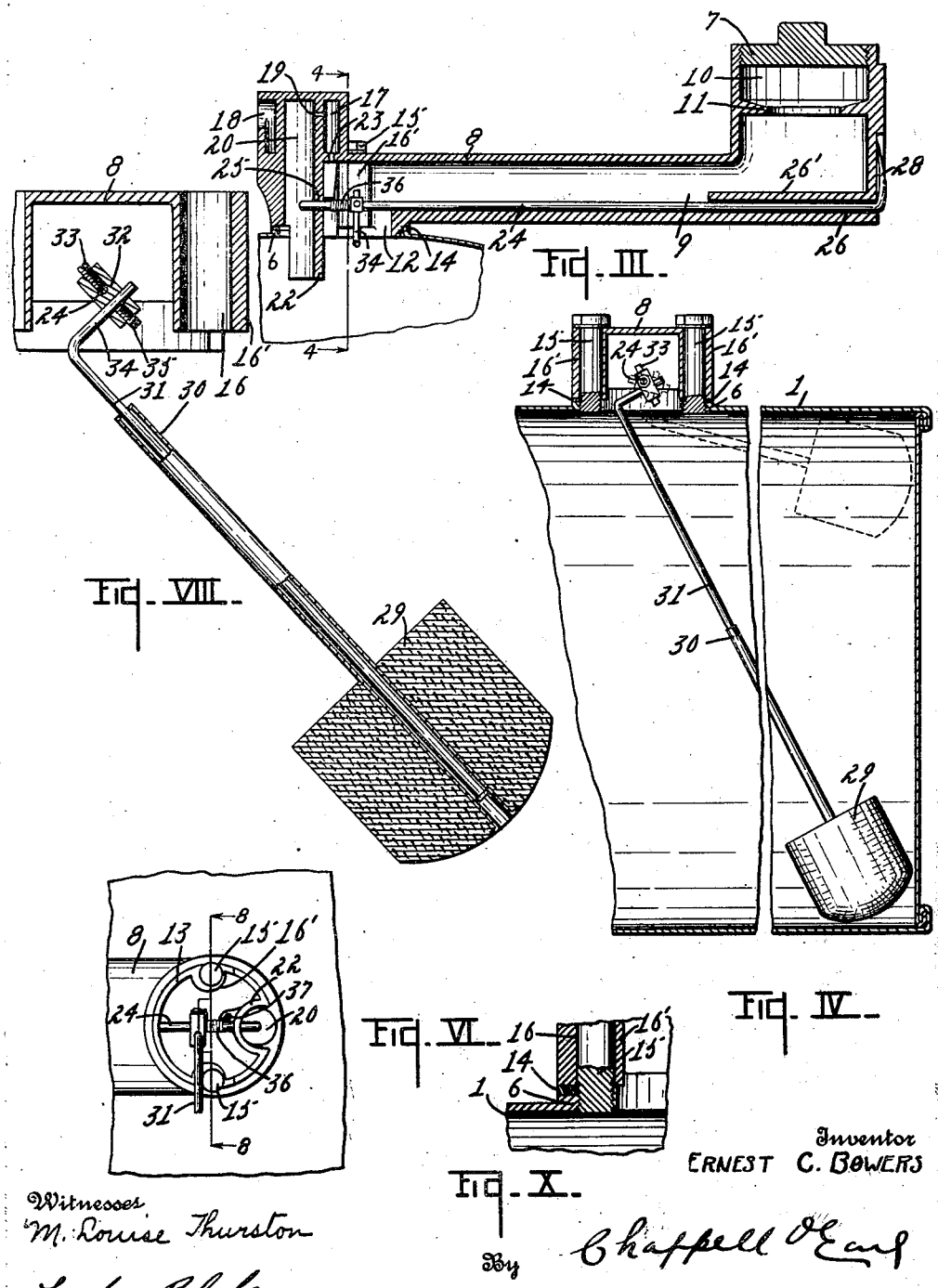

UNITED STATES PATENT OFFICE.

ERNEST C. BOWERS, OF KALAMAZOO, MICHIGAN, ASSIGNOR TO EUGENE COOK, OF KALAMAZOO, MICHIGAN.

TANK-FILLER.

1,324,995.

Specification of Letters Patent.  Patented Dec. 16, 1919.

Application filed November 13, 1917. Serial No. 201,813.

*To all whom it may concern:*

Be it known that I, ERNEST C. BOWERS, a citizen of the United States, residing in the city and county of Kalamazoo and State of Michigan, have invented certain new and useful Improvements in Tank-Fillers, of which the following is a specification.

This invention relates to improvements in tank fillers.

My improved tank filler is especially designed by me as an attachment to the fuel tanks of motor vehicles in which the tank is disposed below a seat, as is the case with "Ford" and certain other motor vehicles. Certain features are, however, advantageous and readily adapted for use in other relations.

The main objects of this invention are:

First, to provide an improved tank filler which permits a free flow of liquid into the tank.

Second, to provide an improved tank filler which is well adapted as an attachment to tanks having an internally threaded filling opening.

Third, to provide an improved tank filler which may be quickly applied to a tank.

Fourth, to provide an improved combination tank filler and gage.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which, Figure I is a detail view of a reservoir or tank provided with my improved filler, a portion of a vehicle seat being shown in vertical section.

Fig. II is a detail plan view of certain parts shown in Fig. I.

Fig. III is a vertical longitudinal section through the filler on a line corresponding to line 3—3 of Fig. II.

Fig. IV is an enlarged transverse section on line corresponding to line 4—4 of Fig. III.

Fig. V is a detail front view showing details of the gage.

Fig. VI is an inverted detail of the discharge end of the filler.

Fig. VII is an enlarged inverted detail showing structural details of the gage.

Fig. VIII is an enlarged detail partially in section on line corresponding to line 8—8 of Fig. VI, showing structural details of the float.

Fig. IX is an enlarged detail section on a line corresponding to line 9—9 of Fig. II showing details of the mounting of the gage.

Fig. X is an enlarged detail section showing details of the mounting of the filler upon the tank.

In the drawing similar reference characters refer to similar parts throughout the several views, and the sectional views are taken looking in the direction of the little arrows at the ends of the section lines.

Referring to the drawing, the tank 1 illustrated is of the cylindrical type commonly employed in a "Ford" motor vehicle. This tank is shown as disposed below a seat comprising a bottom 2 on which the cushion is supported, the spring only of the cushion being indicated. The front wall 3 of the seat has an offset 4 therein providing a rest for the front edge of the seat bottom 2. At the edge of this offset is an upwardly projecting flange 5 within which the cushion is disposed.

The tank is provided with an internally threaded filling opening 6 adapted to receive a closure plug such as the threaded plug 7 shown in the inlet of my improved tank filler, it being my practice to remove this closure plug from the tank where my filler is applied as an attachment and use the same as a closure for the filler. My improved filler 8 comprises a horizontal conduit portion 9 terminating at its front end in an upwardly projecting inlet chamber 10 internally threaded to receive the cap 7. This inlet chamber has an annular internal flange 11 therein adapted to receive the spout of a funnel or the nozzle of a filling hose. At the rear end of the conduit portion is a downwardly directed discharge 12 of cylindrical form adapted to fit the filler opening 6, the discharge being provided with an annular flange 13 fitting within the opening 6 so that when a gasket 14 is disposed between the discharge of the filler and the flange of the filler opening a tight joint is provided.

The filler is secured to the tank by means of the screws 15 which are arranged through bores 16 extending from the top of the filler. The bores 16 are formed by coring the internal bosses 16'. The threads of the screws engage with the threads provided for the usual closure cap. The screws are supported so that their threads are held in effective engagement with the threads of the tank opening. This obviates the necessity of providing bolt or screw holes in the tank proper.

The filler is provided with a bent chamber 17 at its inner end having an opening 18 to the atmosphere and an opening 19 communicating with the vertical passage 20. This allows for the escape of air from the tank while liquid is flowing through the filler, thereby permitting a free flow thereof and preventing back pressure and bubbling and blowing. A baffle 22 at the rear of the discharge opening guards the passage 18 from the flowing liquid. A drain opening 23 is provided for the vent chamber. The vent opening 19 is disposed at the rear of the vent chamber so that any liquid that is likely to be carried through the vent opening in the form of minute drops is collected in the vent chamber and drains back into the tank through the opening 23. With the parts thus arranged the liquid may flow into the tank to the full capacity of the conduit without bubbling or obstruction on account of back pressure of air.

I preferably employ in this connection, a gage consisting of the gage shaft 24 journaled at its rear end in an opening 25 in the front wall of the vent passage and at its front end in a cored opening 26 formed in a boss 26' on the bottom of the conduit. The front end of the filler is provided with gage indicia 27, while the shaft 24 has an index 28 coacting with this gage indicia.

The float 29 is provided with a telescoping arm comprising the tubular section 30 secured to the float and the rod section 31 secured to the shaft 24 by means of the blocks 32 which is secured to the shaft 24 by the set screw 33, the rod section 31 having a lateral portion 34 secured to the block by means of the set screw 35. When the level of the liquid drops the float arm extends and as it raises it may collapse thus allowing the float to work in a confined space, as where the end of the tank or a baffle plate in a tank necessitates this.

To steady the movement of the float I provide a coiled spring 36, one end of which is secured to the block 32 and the other to a pin 37, the spring being coiled about the shaft of the gage.

With the parts thus arranged I provide a gage which may be mounted as a part of the filler and one which is effective, and at the same time inexpensive. My improved tank filler is simple and economical in structure and may be applied to the tank of a motor vehicle such as a "Ford" with very little trouble, it only being necessary to form a slot 38 in the flange of the seat front to receive the filler with the inlet thereof on the outside of the flange, as shown in Fig. I. The filler is provided with ears 39 adapted to receive the bolts 40, by means of which the filler is attached to the flange. Ears 41 are preferably provided and adapted to rest upon the seat bottom 2 which is slotted at 42 to receive the filler.

I have illustrated and described my improvements in an embodiment which I have found very practical and desirable. I have not attempted to illustrate or describe the various modifications and adaptations which might be necessary or desirable to adapt my improvements to other forms of tanks or for use in other relations as I believe the disclosure made will enable those skilled in the art to which my invention relates to embody or adapt the same as may be desired.

Having thus described my invention what I claim as new and desire to secure by Letters Patent is:

1. In a device of the class described, the combination with a tank having an internally threaded filling opening, of a filler provided with an attaching collar having an annular flange fitting within said filling opening provided with screw bores, the outer sides of which are alined with the filler opening threads so that attaching threads inserted in said bores are supported with their threads in engagement with the threads of said filling opening.

2. The combination with a tank having a filling opening, of a filler body member having a conduit therein with an inlet chamber at its front end and a discharge at its rear end, a vent chamber at the rear end of said filler body member provided with an opening communicating with the atmosphere, a vent passage open at its lower end projecting centrally into said chamber and having an opening communicating therewith on its side opposite said atmospheric opening, said vent chamber having a drain in the bottom thereof, and a baffle for said vent passage disposed at the rear of said discharge.

3. The combination with a tank having a filling opening, of a filler body member having a conduit therein with an inlet chamber at its front end and a discharge at its rear end, a vent chamber at the rear end of said filler body member provided with an opening communicating with the atmosphere, and a vent passage open at its lower end projecting centrally into said chamber and having an opening communicating therewith on its side opposite said atmospheric opening, said vent chamber having a drain in the bottom thereof.

4. In a device of the class described, a filler body member having a conduit therein with an inlet chamber at its front end and a discharge at its rear end, a vent chamber at the rear end of said filler body member provided with an atmospheric opening, a vent passage projecting centrally into said chamber and having an opening communicating therewith on the side opposite its said atmospheric opening, said vent chamber having a drain in the bottom thereof, and a baffle for said vent passage disposed at the rear of said discharge.

5. In a device of the class described, a filler body member having a conduit therein with an inlet chamber at its front end and a discharge at its rear end, a vent chamber at the rear end of said filler body member provided with an atmospheric opening, and a vent passage projecting centrally into said chamber and having an opening communicating therewith on the side opposite its said atmospheric opening, said vent chamber having a drain in the bottom thereof.

6. In a device of the class described, a filler body member having a conduit therein with an inlet chamber at its front end and a discharge at its rear end, a vent chamber at the rear end of said filler body member provided with an atmospheric opening, and a vent passage communicating with said vent chamber, said vent chamber having a drain in the bottom thereof.

In witness whereof, I have hereunto set my hand and seal in the presence of two witnesses.

ERNEST C. BOWERS. [L. S.]

Witnesses:
LUELLA G. GREENFIELD,
MARGARET L. GLASGOW.